UNITED STATES PATENT OFFICE.

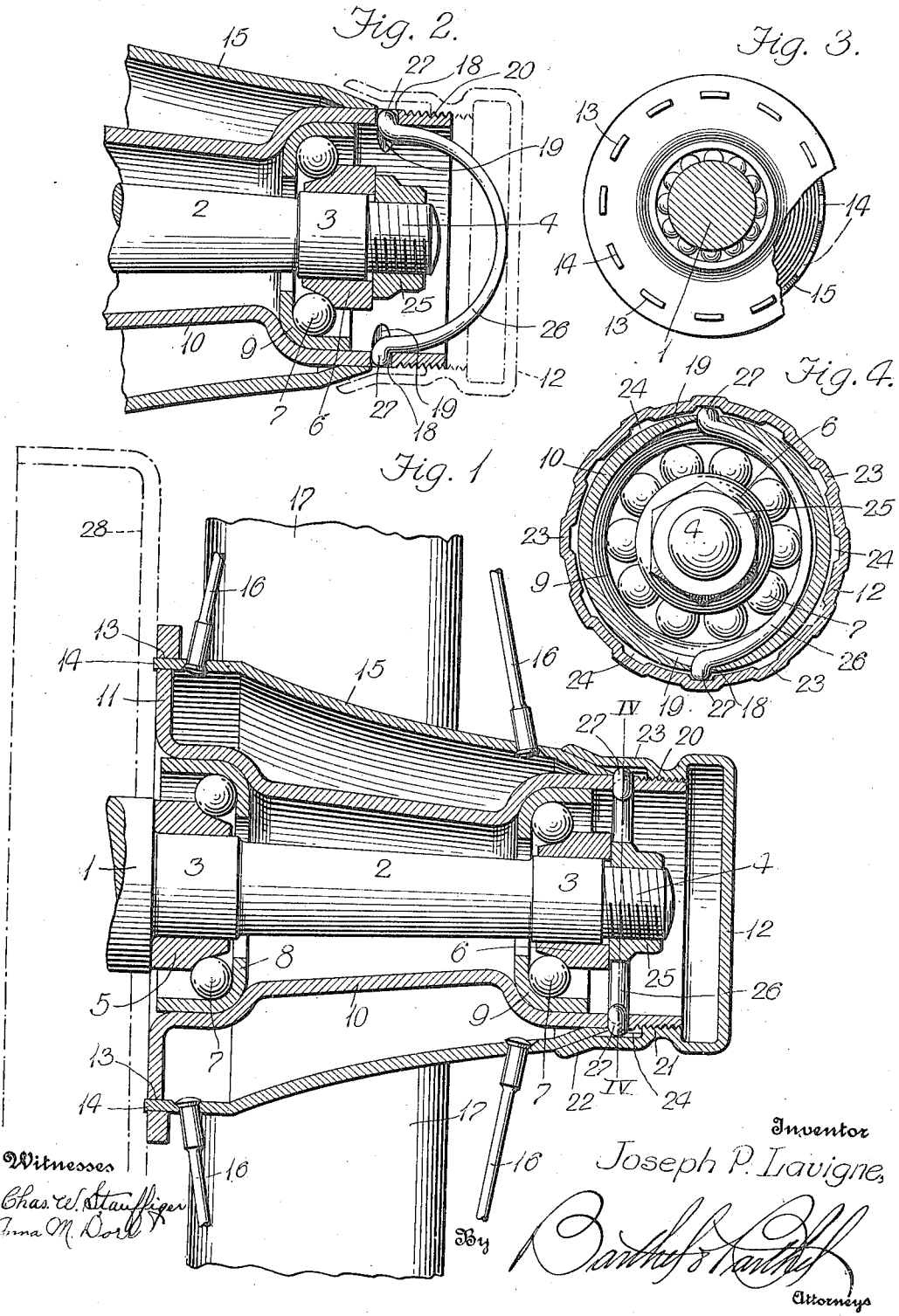

JOSEPH P. LAVIGNE, OF DETROIT, MICHIGAN.

HUB CONSTRUCTION.

1,160,726.  Specification of Letters Patent.  Patented Nov. 16, 1915.

Application filed November 27, 1914. Serial No. 874,171.

*To all whom it may concern:*

Be it known that I, JOSEPH P. LAVIGNE, a citizen of the United States of America, residing at Detroit, in the county of Wayne and State of Michigan, have invented certain new and useful Improvements in Hub Construction, of which the following is a specification, reference being had therein to the accompanying drawings.

A great many automobile manufacturers or builders are making or adopting wire wheels for their machines and by wire wheels, I mean vehicle wheels having metallic hubs, wire spokes, etc. On account of being comparatively light in weight, it is the present practice to carry one or more completely equipped wheels that can be substituted for a driven wheel should the tire thereof be punctured or a driven wheel otherwise injured. To permit of wheels being exchanged with considerable facility and at the same time insure a positive and reliable connection between a wheel and an axle or the supporting member thereof, is the principal object of my invention.

Another object of my invention is to provide a simple and durable locking device for simultaneously retaining the hub of a wheel upon an axle or support and a cap or closure upon the end of the hub, thus preventing either from becoming accidentally displaced.

A further object of this invention is to provide a locking device embodying a resilient member arranged and held whereby a partial rotation of the same retracts the ends of said member and releases the device held thereby.

The above and other objects are attained by a mechanical construction that will be hereinafter specifically described and then claimed, and reference will now be had to the drawing, wherein—

Figure 1 is a longitudinal sectional view of a hub construction in accordance with this invention, showing a locking device thereof in a closed or extended position; Fig. 2 is a similar view of a portion of the same, showing the locking device in an open or retracted position; Fig. 3 is an elevation of the inner end of the hub, partly broken away and upon a smaller scale, and Fig. 4 is a cross sectional view taken on the line IV—IV of Fig. 1.

In describing my invention by aid of the views above referred to, I desire to point out that I intend the same as merely illustrative of an example whereby my invention may be applied in practice, and I do not care to limit the invention to the precise arrangement and construction of parts shown. The following description is therefore to be broadly construed as including substitute arrangements and constructions that are the obvious equivalent of those shown.

In the drawing, 1 denotes a portion of an axle having a spindle 2, collars 3 and a screwthreaded stem 4. Mounted upon the collars 3 are ball race members 5 and 6 for anti-frictional balls 7 which are retained in engagement with the members 5 and 6 by cup-shaped members 8 and 9. These members are mounted in the crowned or bell-shaped ends of a tapering spindle hub or shell 10 that has the inner end thereof provided with a peripheral flange 11 and the outer end extended to coöperate with a cap 12 in providing an inclosure or housing for the outer end of the axle spindle.

The peripheral flange 11 of the spindle hub or shell 10 is provided with circumferentially arranged openings or slots 13 to receive spaced lugs 14 carried by the inner or large end of a tapering wheel hub 15, said wheel hub having the outer or small end thereof engaging the outer crowned end of the spindle hub 10. The hub 15 is made of sheet metal and attached to said hub are the inner ends of spokes 16, said spokes having the outer ends thereof suitably connected to a felly or rim 17.

The spindle hub 10 has diametrically opposed walls thereof, at the outer end of said hub, provided with openings 18, and communicating with said openings are grooves 19, said grooves extending in the direction of the circumference of the outer end of the hub and gradually merging into the walls thereof, as best shown in Fig. 4. In addition to the openings 18 the outer end of the spindle hub is exteriorly screwthreaded, as at 20, to receive an interiorly screwthreaded portion 21 of the cap 12. The cap 12 has the inner end thereof flared or enlarged, as at 22, and between the screwthreaded portion 21 and the flared end of said cap are circumferentially arranged offset portions 23 providing spaced grooves or recesses 24 in the inner wall of the cap.

An ordinary nut 25 is screwed upon the stem 4 and should this nut become accidentally displaced, the cap 12 prevents the same from becoming lost. To lock the cap upon the outer end of the spindle hub and coöperate therewith in retaining the wheel hub 15 in engagement with the spindle hub, I employ a novel locking member 26 adapted to be housed in the outer end of the spindle hub. This member is semi-circular and is preferably made of spring steel. The ends of the member are out-turned or provided with pins 27 adapted, in a locked position, to extend through the openings 18 into recesses 24 of the cap 12, said pins preventing the cap from accidentally rotating and at the same time engaging the outer end of the wheel hub 15 and coöperating with said cap in retaining said wheel hub in engagement with the spindle hub. The central portion of the bowed locking member 26 is cut away or of less thickness or diameter than the ends thereof to add resiliency to said member and thus permit of said member being easily manipulated. As shown in Fig. 4, the outer end of the spindle hub 10 readily receives the member 26 and the resiliency of said member is sufficient to retain the ends thereof in the grooves 19 and the openings 18. When the member 26 is swung outwardly, as shown in Fig. 2, the material bordering upon the inner ends of the openings 18 serves as cam surfaces for retracting the ends of the member and the pins 27 are sufficiently withdrawn to permit of the cap 12 being unscrewed and the wheel hub 15 removed from the spindle hub.

In assembling the parts of the hub or placing the wheel hub 15 in engagement with the spindle hub 10, it is only necessary to insert the lugs 14 of the hub 15 in the openings 13 of the flange 11, swing the member 26 into the outer end of the hub 10 and then screw the cap 12 upon the outer end of the hub 10. The resiliency of the member 26 allows the pins 27 to recede as the cap 12 is screwed home, and should the member 26 protrude from the outer end of the hub 10, the cap 12 will engage said member and gradually swing the same into the outer end of said hub. Furthermore, the resiliency of said member 26 causes the same to snap into a locked position as the outer portion of said member enters the housing formed by the outer end of the spindle hub 10, and when in a locked position, the cap 12 is prevented from becoming accidentally displaced, yet it may be manually removed by reason of the pins 27 receding as the cap is rotated.

As illustrated by dotted lines in Fig. 1, the wheel hub 15 can be readily interlocked with a brake drum 28, carried by the spindle hub 10 and in consequence of this construction a wheel can be shifted from one axle to another. For instance, should the tire of a rear axle wheel be punctured, it is possible to exchange the punctured wheel with a front axle wheel and thus place the punctured wheel where it will receive the least load till such time that the tire can be repaired or a new one substituted therefor. However, the exchangeability of the wheels is second in importance to that of the novel locking member 26, as this member serves two purposes and the facility with which the same can be manipulated is of paramount importance, particularly in connection with racing cars when a quick exchange of wheels is to be made.

From the foregoing it will be observed that my invention, when broadly considered, involves inner and outer hubs, a cap for retaining the outer hub upon the inner hub and a swiveled locking device housed by the inner hub and adapted to simultaneously hold the outer hub thereon and lock said cap against accidental displacement.

What I claim is:

1. In a hub construction, an inner hub, an outer hub detachably mounted thereon, a cap mounted upon said inner hub and engaging said outer hub, and retractable means in said inner hub and adapted to simultaneously lock said outer hub and said cap upon said inner hub.

2. In a locking device for hubs, the combination with a hub having a detachable cap, of a resilient member housed within said hub and having retractable ends protruding from said hub and adapted to lock said cap against accidental displacement and permit of said cap being manually removed from said hub.

3. In a locking device for hubs, the combination with a hub having a detachable cap, of a locking member movably arranged in said hub and having ends thereof protruding from diametrically opposed sides of said hub to engage said cap and prevent accidental displacement thereof.

4. In a locking device for hubs, the combination with a hub having a detachable cap, of a locking member within said hub and having retractable ends protruding therefrom and engaging said cap and capable of being retracted by a swinging movement of said member.

5. In a hub construction, inner and outer hubs, and a locking device movably supported within said inner hub and having ends protruding therefrom to engage said outer hub, and means whereby the ends of said member can be retracted by a swinging movement thereof.

6. In a hub construction, an inner hub having a peripheral flange, an outer hub having the inner end thereof interlocked with the flange of said inner hub, a cap detachably mounted upon the outer end of said inner hub and engaging the outer end of said outer hub, and means protruding from the walls of said inner hub and adapted to lock said cap in engagement with the outer end of said outer hub.

7. In a hub construction, inner and outer hubs, and a member swiveled in said inner hub and adapted to be swung therein to project the ends thereof from said hub to lock said outer hub upon said inner hub.

In testimony whereof I affix my signature in presence of two witnesses.

JOSEPH P. LAVIGNE.

Witnesses:
ANNA M. DORR,
OTTO F. BARTHEL.

Copies of this patent may be obtained for five cents each, by addressing the "Commissioner of Patents, Washington, D. C."